Dec. 29, 1925.
F. GARNER ET AL
1,567,587
APPARATUS FOR TREATING RUBBER AND THE LIKE
Filed March 6, 1924    10 Sheets-Sheet 1
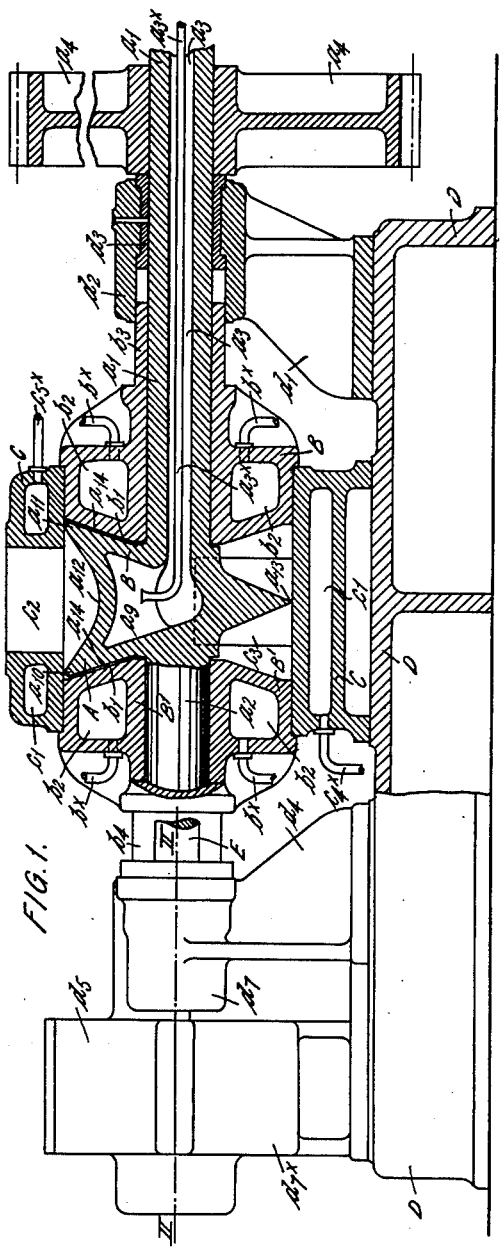
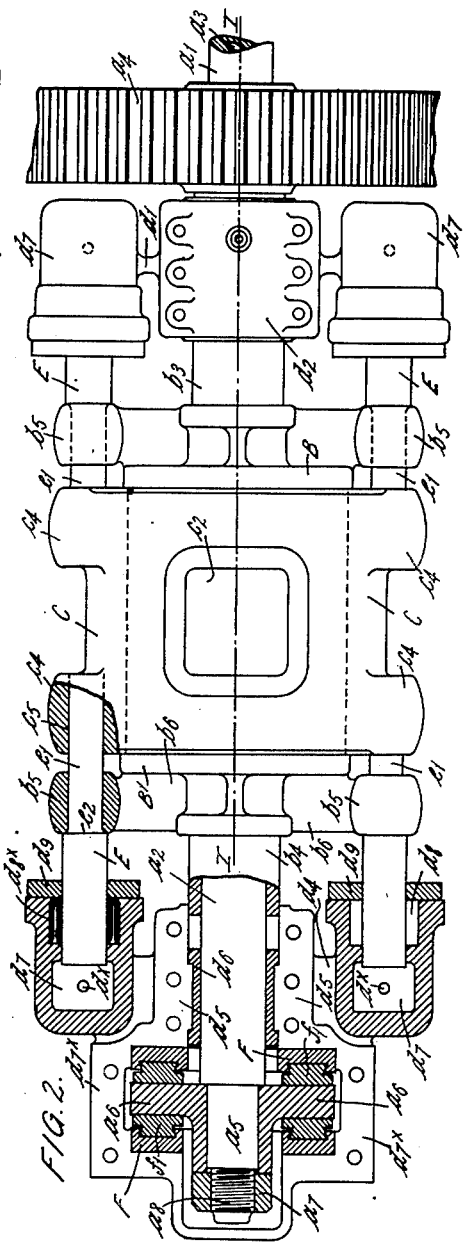
INVENTORS:
FRANK GARNER
ALFRED HALL

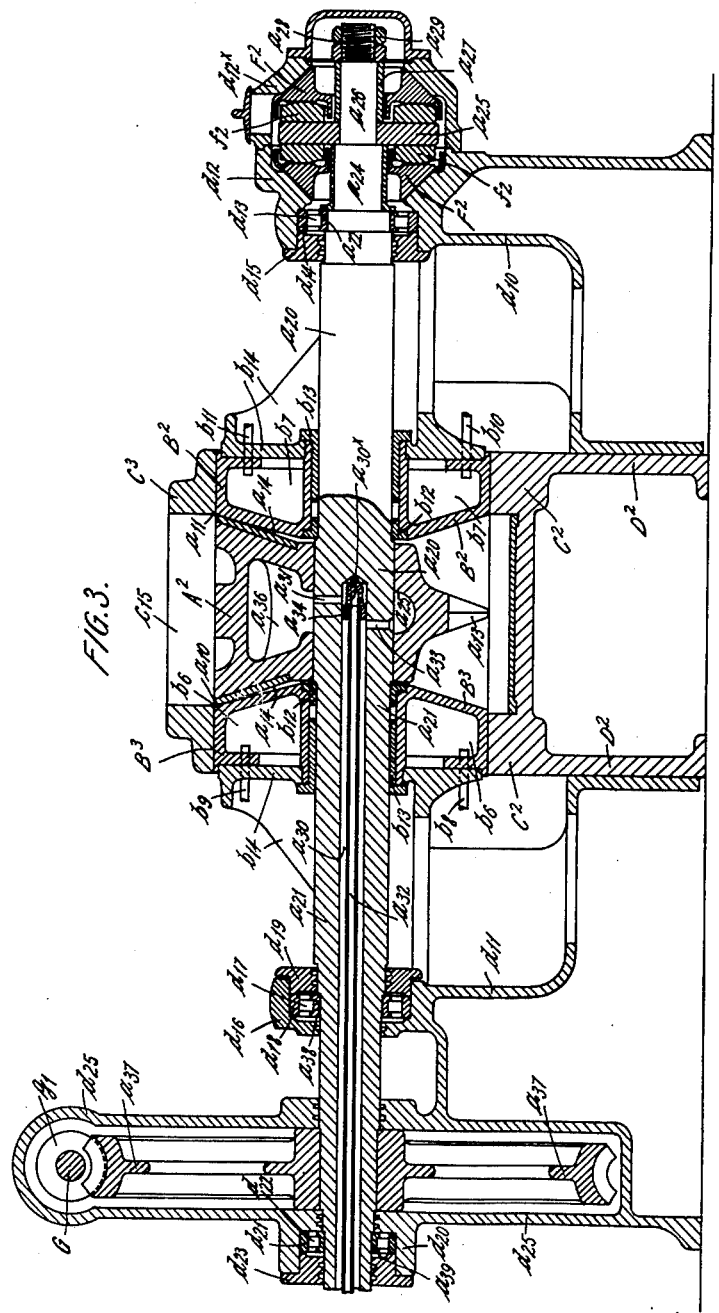

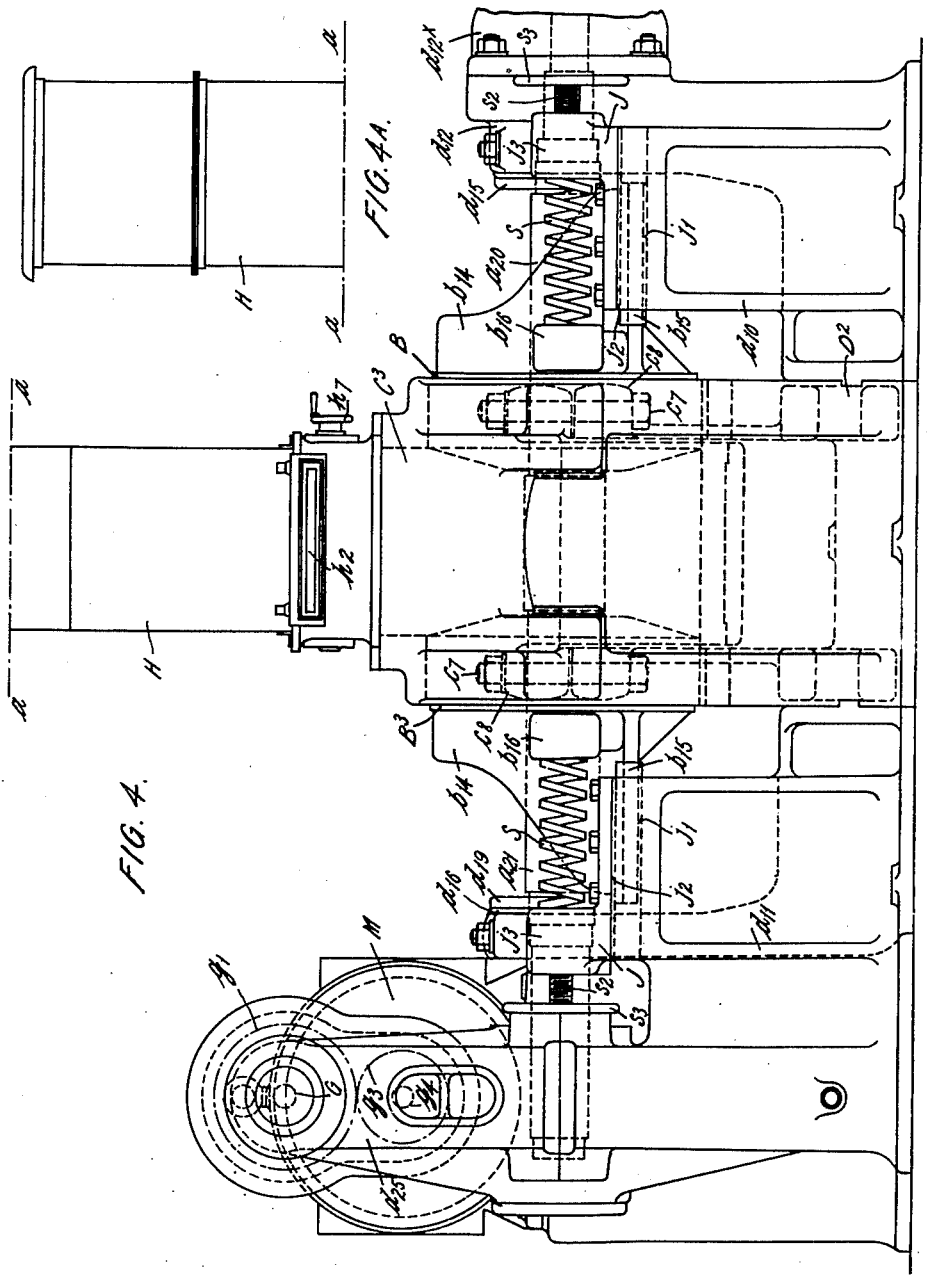

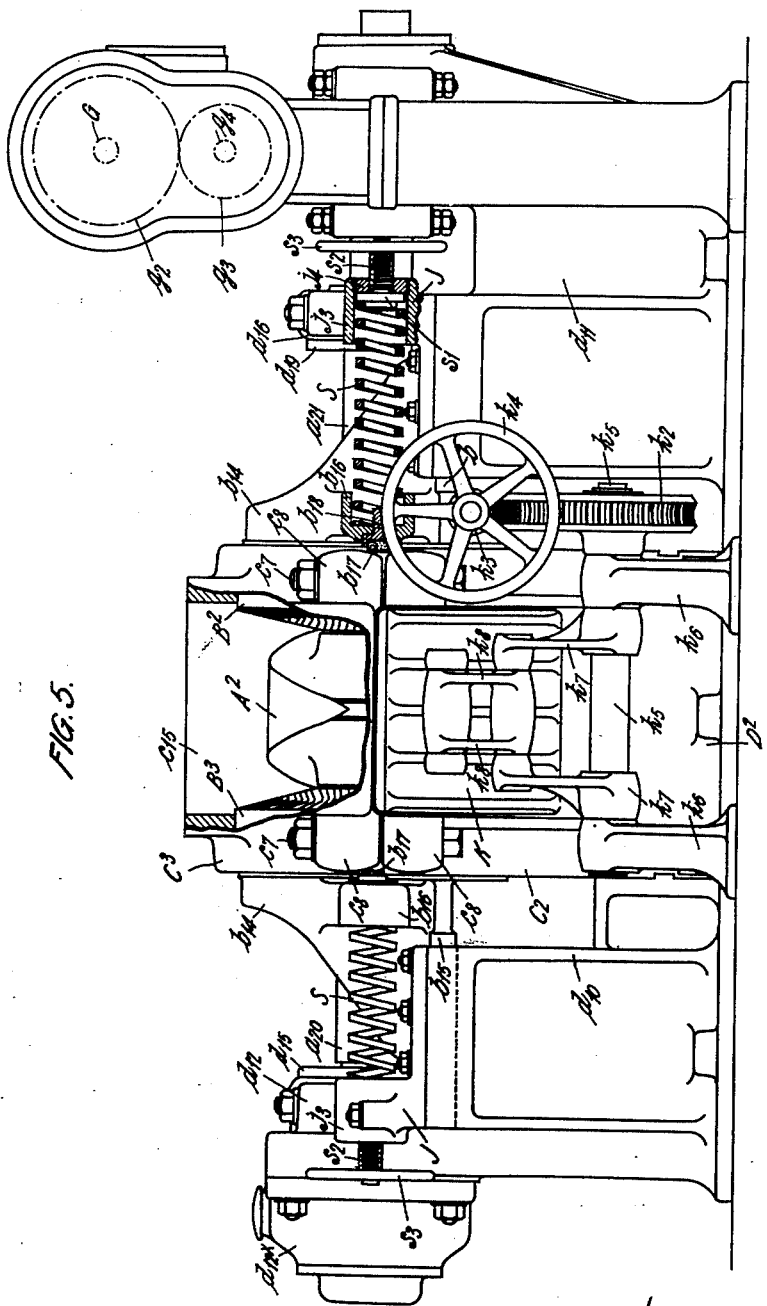

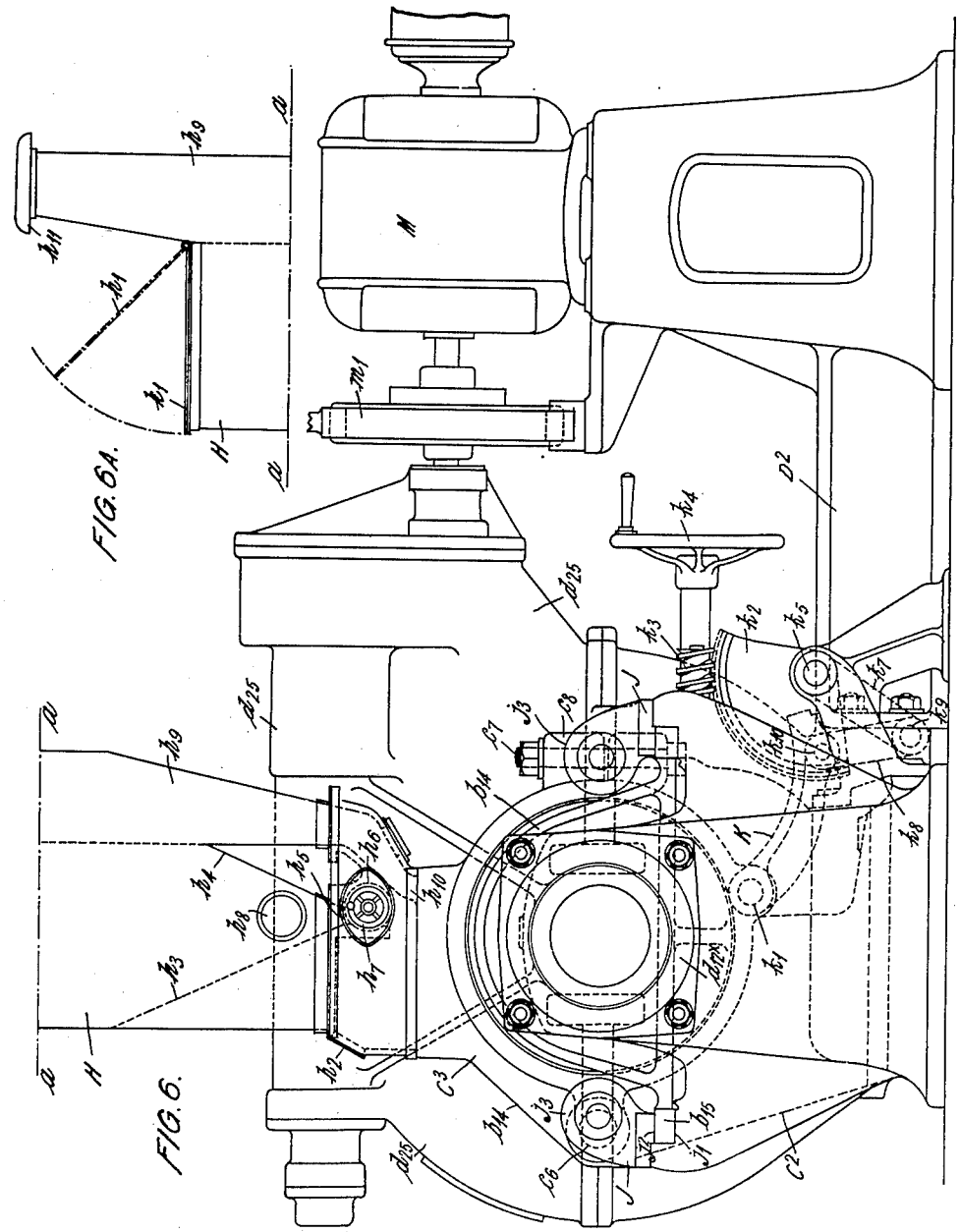

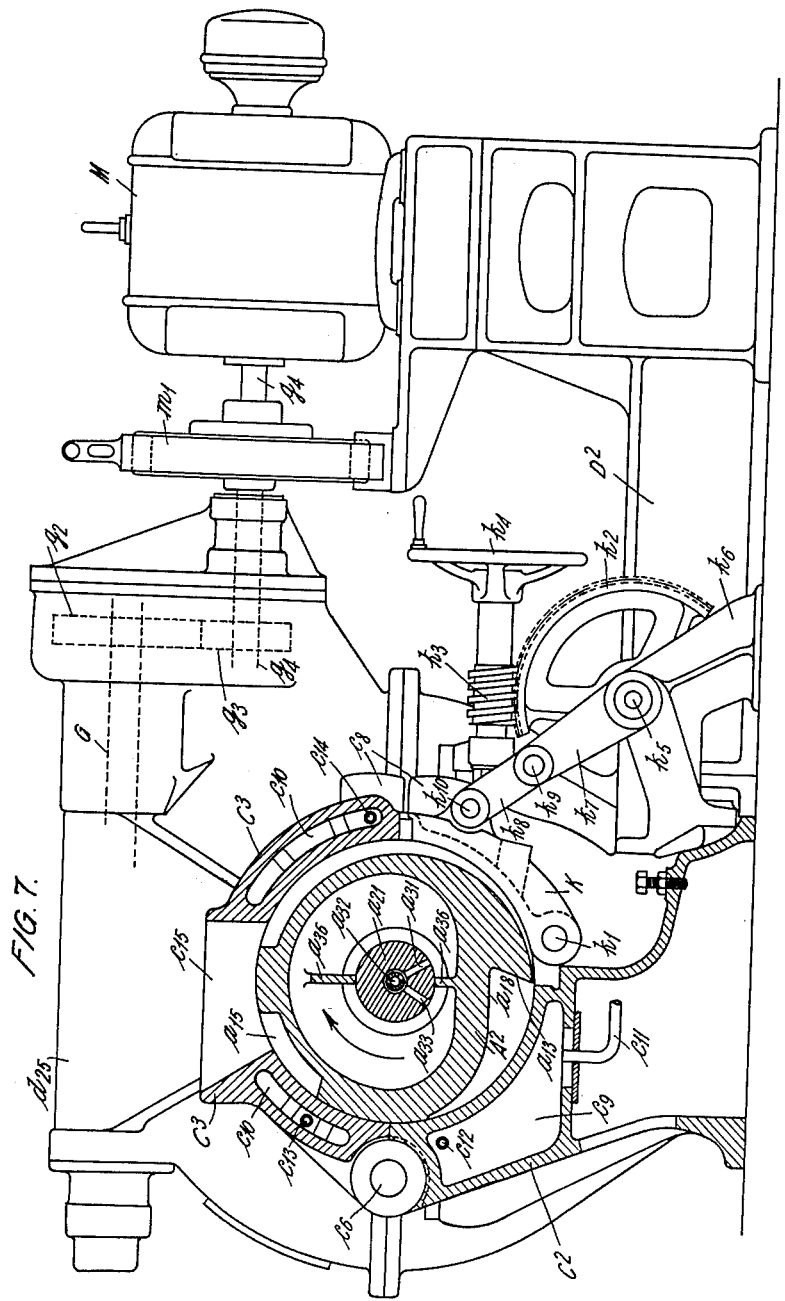

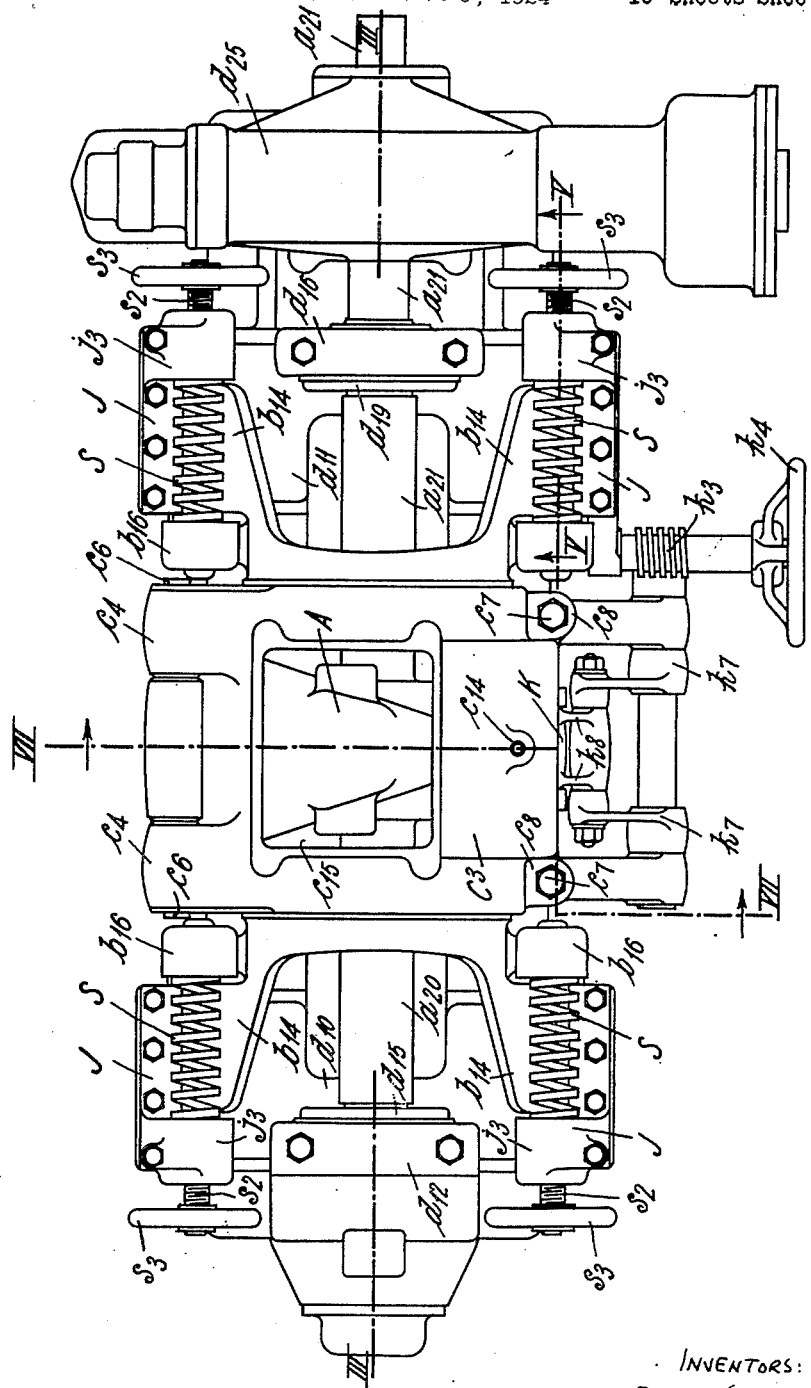

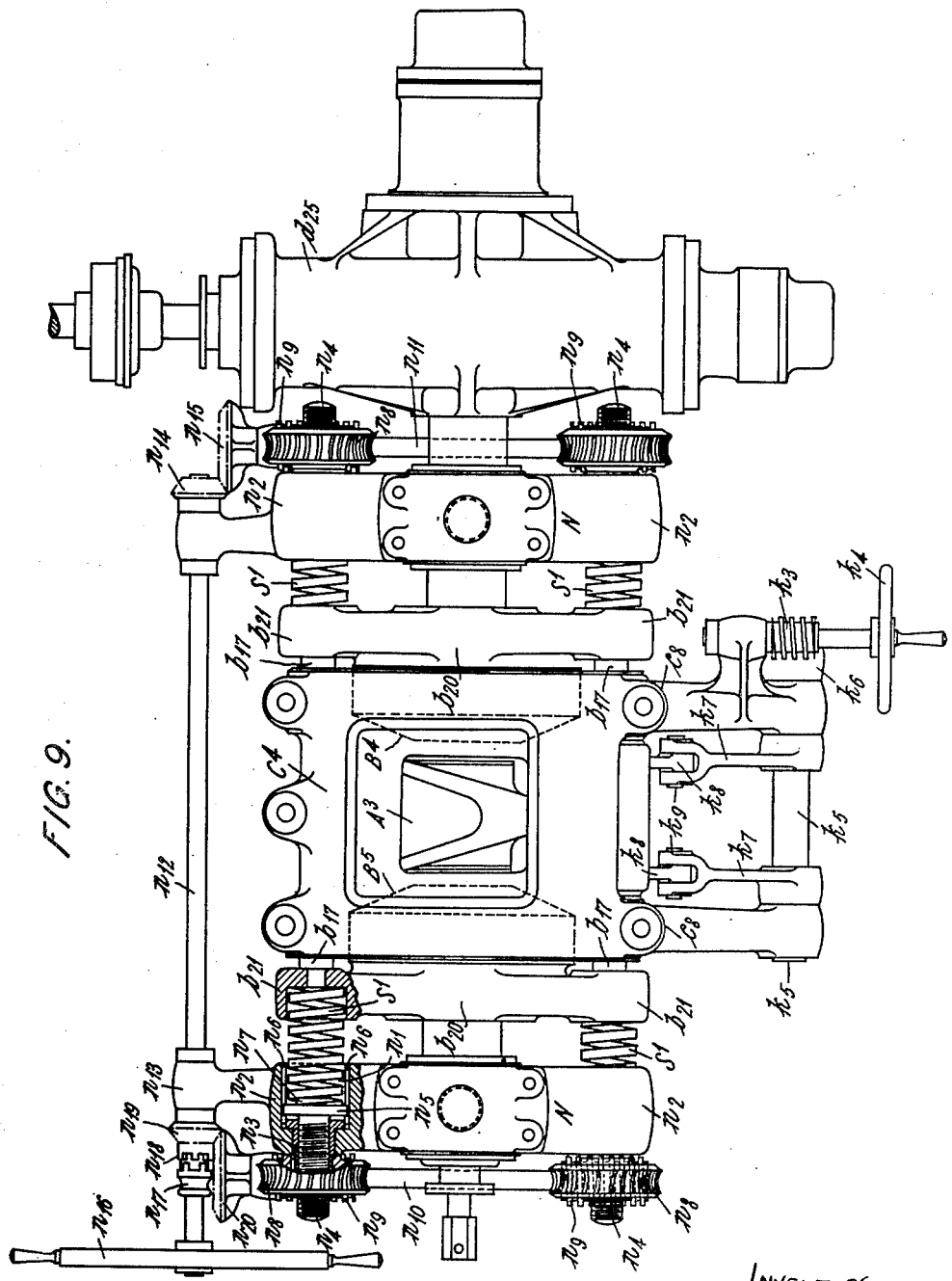

Dec. 29, 1925.
F. GARNER ET AL
1,567,587
APPARATUS FOR TREATING RUBBER AND THE LIKE
Filed March 6, 1924
10 Sheets-Sheet 9
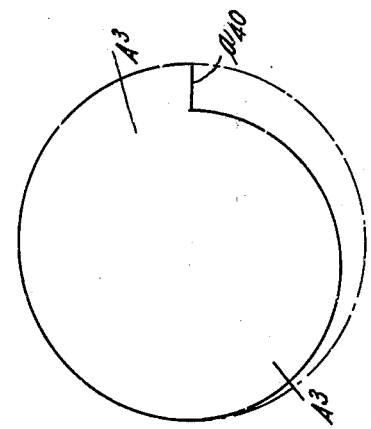
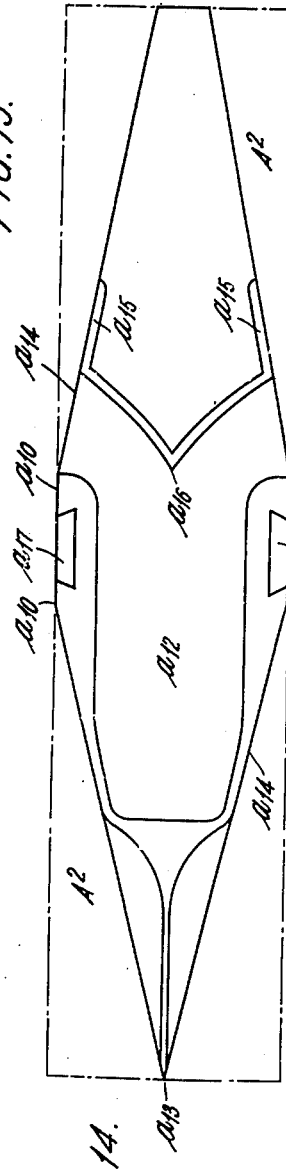
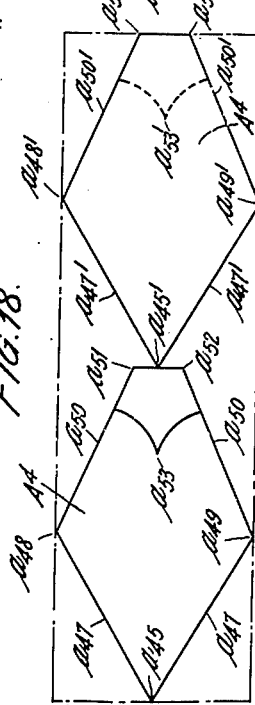
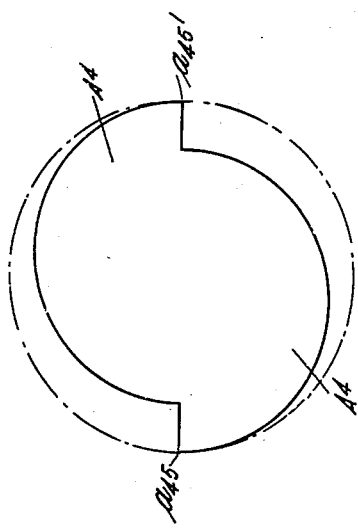
INVENTORS:
FRANK GARNER
ALFRED HALL

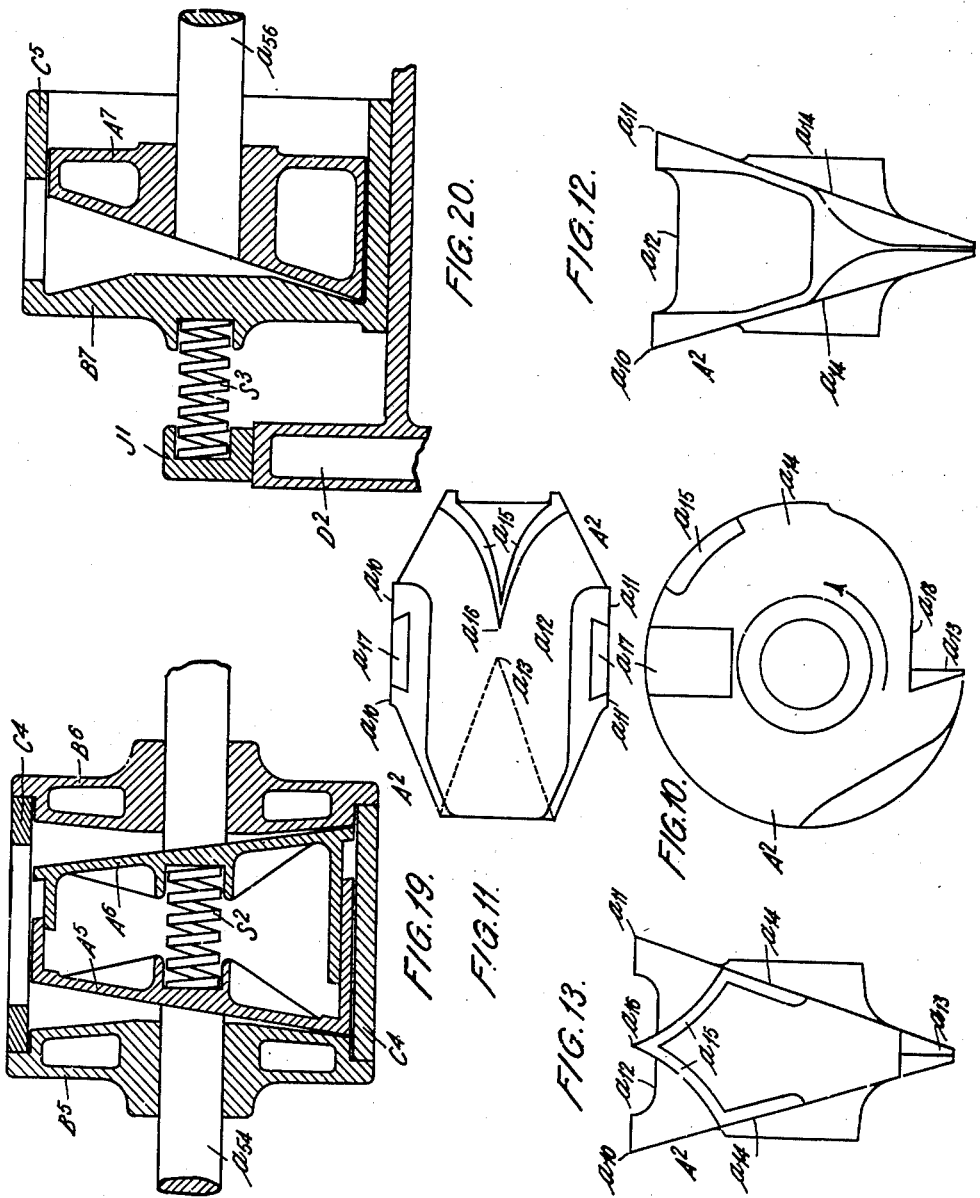

Patented Dec. 29, 1925.

1,567,587

UNITED STATES PATENT OFFICE.

FRANK GARNER, OF CHAPEL-EN-LE-FRITH, AND ALFRED HALL, OF ANSDELL, ENGLAND.

APPARATUS FOR TREATING RUBBER AND THE LIKE.

Application filed March 6, 1924. Serial No. 697,329.

*To all whom it may concern:*

Be it known that we, FRANK GARNER and ALFRED HALL, both British subjects, residing, respectively, in Chapel-en-le-Frith, in the county of Derby, England, and Ansdell, in the county of Lancaster, England, have invented certain new and useful Improvements in Apparatus for Treating Rubber and the like, of which the following is a specification.

This invention relates to apparatus for crushing, grinding, masticating or mixing rubber, rubber compounds or the like plastic materials, and is also applicable for washing scrap rubber and the like; and the object is primarily to provide a machine which is adapted to mix very intimately the pure rubber, and the minerals and other filling, which are necessary for various purposes, and which is also suitable for use as a washer.

According to the present invention the material to be treated is subjected to a disintegrating, grinding, masticating or mixing action between the interior surfaces of a casing and the exterior surfaces of a member located within the casing, the said interior surfaces and exterior surfaces being so arranged that whilst there is relative rotation between them, limited relative axial movement in opposition to a yielding resistance, is permitted between the end parts of said surfaces when the pressure in an axial direction, due to the reaction of the said material interposed between the said surfaces overcomes the said resistance.

In the preferred form of machine constructed in accordance with the invention, the normal width of the space between the said interior and exterior surfaces is preferably different at different angular positions, the main casing being fixed, and being fitted with movable end plates adapted to move axially against a yielding pressure which may be a fluid pressure, a spring pressure or pressure produced by weights and levers the member within the casing being a driven rotating member fixed against axial movement, and having side surfaces which extend in an inclined direction from an apex to parts where the said member attains maximum axial width; the end plates preferably have guide plates extending through the casing, and these are guided and held against rotation by fixed external guides; and where the yielding pressure is provided by means of springs, the pressure of the several springs, or groups of springs, can be adjusted simultaneously.

The invention also comprises improvements in construction as hereinafter described and claimed.

We have illustrated our invention in the accompanying drawings, in which:—

Figs. 1 and 2 show a modification in which the yielding pressure on the end-plates of the casing is obtained by means of hydraulic rams.

Fig. 1 is an elevation mainly in section on the plane I, I of Fig. 2.

Fig. 2 is a plan view partly in section on the plane II, II of Fig. 1.

Figs. 3 to 8 show a modification in which the yielding pressure on the end-plates of the casing is obtained by means of springs.

Fig. 3 is a view similar to Fig. 1 and is an elevation in section on the plane III, III of Fig. 8, with the feed hopper removed.

Fig. 4 is a corresponding front elevation in outside view, the fragment Fig. 4A showing the portion of the feed hopper located above the line a, a.

Fig. 5 is a corresponding rear elevation with the feed hopper removed, the casing being shown partly in medial section, and the right hand spring controlled pressure means in section on the line V, V of Fig. 8.

Fig. 6 is an end view, the fragment Fig. 6A showing the part of the feed hopper located above the line a, a.

Fig. 7 is a corresponding end view partly in section on the line VII, VII of Fig. 8, and with the feed hopper removed.

Fig. 8 is a plan view to a reduced scale.

Fig. 9 is a plan view corresponding with Fig. 8, and shows a modification.

Fig. 10 is an end view of the preferred form of rotor

Fig. 11 is a corresponding plan.

Fig. 12 is a side elevation viewed from the left of Fig. 10.

Fig. 13 is a side elevation viewed from the right of Fig. 10.

Fig. 14 is a development of the periphery of the rotor.

Figs. 15 and 16 are, respectively, a diagrammatic elevation, and development to a reduced scale, of a modified construction of rotor.

Figs. 17 and 18 are views similar to Figs. 15 and 16, and show a further modified construction of rotor.

Fig. 19 is a diagrammatic elevation in medial section of a modified construction, and Fig. 20 is a view similar to Fig. 19 and shows a further modification.

Referring first to Figs. 1 and 2;—

A is the rotor; B and B' the movable end-plates of the casing; C is the fixed or main casing, and D is the main frame of the machine.

The rotor A is shown as made integral with a shaft portion $a^1$ on the right, and a shaft portion $a^2$ on the left; the portion $a^1$ is hollow and a cooling or heating medium is supplied to the interior $a^0$ of the rotor through an inlet pipe $a^{3x}$ located in the bore $a^3$ of the shaft portion $a^1$, and being discharged through the annular channel between the pipe $a^{3x}$ and the bore.

The portion A of the shaft is rotatably carried by the bracket $d^1$, in the bearing part $d^2$ of which the bearing bush $d^3$ fits, and any suitable driving means are provided, such as a gear wheel $a^4$ keyed on the shaft $a^1$. The shaft part $a^2$ is carried by a bracket $d^4$, in the bearing part $d^5$ of which the bearing bush $d^6$ fits. The rotor is held fixed axially by a thrust collar $a^6$ fitting the reduced part $a^5$ of the shaft $a^2$, the collar being located axially on the shaft by the nut $a^7$ fitting the screwed part $a^8$ of the shaft $a^2$. $f^1$ are segmental pads of which there are two sets the faces of the respective sets bearing on the respective faces of the thrust collar $a^6$; the pads of the respective sets are held against axial movement by fixed collars F carried by an extension $d^{x7}$ of the brackets $d^4$. The parts of the pads which bear against the faces of the collars F are formed of two surfaces inclined at an angle slightly less than 180° the intersecting line being a radial line, so that the pads may have a limited rocking movement so as to ensure effective lubrication in well known manner.

The main casing C is carried from the frame D, and is held against axial and rotational movement; the casing has a jacket $c^1$ through which the heating or cooling medium is circulated, the inlet $c^{4x}$ and outlet $c^{5x}$ being connected to circulating pipes, $c^2$ is the inlet through which the material is supplied to the machine, and $c^3$ is the outlet therefor; the inlet $c^2$ is usually fitted with a feed hopper and the outlet $c^3$ is provided with a tightly fitting door.

The end-plates B and B' of the casing C have cylindrical peripheries which are a working fit in the cylindrical bore of the casing C; the end plates are held against rotation but are free to move axially against an adjustable yielding pressure; they have sleeve-like extensions $b^3$ and $b^4$ the bores of which are a working fit on the respective shaft parts $a^1$ and $a^2$, and the ends of which fit respectively in the bearings $d^2$ and $d^5$.

Each end-plate has an arm $b^6$ at the opposite ends of which bosses $b^5$ are formed by which the end-plates are prevented from turning and through which a yielding pressure, tending to force the end-plates inwardly is applied.

Any suitable means may be employed to provide this pressure; in this modification hydraulic plungers E are provided, the reduced parts $e^1$ of which pass through the bosses $b^5$, the shoulders $e^2$ engaging the outer faces of the bosses. The parts $e^1$ of the plungers fit in holes $c^5$ formed in bosses $c^4$ cast integral with the main casing C and serve to hold the end-plates against rotation. The plungers E fit in hydraulic cylinders $d^7$, the right hand pair of cylinders being carried from the bracket $d^1$ and the left hand pair from the bracket $d^4$. Cup-leathers $d^{8x}$ or other suitable form of packing are fitted in the respective annular recesses $d^8$, and are held in place by the covers $d^9$. The various cylinders $d^7$ communicate through openings $d^x$ with any suitable source of fluid pressure, say a pump or hydraulic accumulator by which the desired pressure is maintained.

The faces $b^1$ of the end-plates, are, in this modification, of conical configuration, and may be provided with teeth or serrations of size and pitch suitable for the purpose of and material to be operated upon by the machine.

A heating or cooling medium is circulated through the interiors $b^2$ of the end-plates, by means of flexible circulating pipes $b^x$.

The periphery of the rotor has a maximum axial width across the points $a^{10}$, $a^{11}$, and tapers in both directions circumferentially to an apex $a^{13}$ which is usually diametrally opposite to the points $a^{10}$, $a^{11}$, and the planes of the side faces $a^{14}$ are correspondingly inclined to the axis of rotation and corresponding with the inclinations of the coned faces $b^1$ of the end plates B, B'.

The periphery of the rotor, is for some distance on each side of the line joining $a^{10}$ to $a^{11}$, usually of concave configuration as shown at $a^{12}$, which concave portion may be spanned across by V shaped bars $a^{15}$ forming a secondary apex $a^{16}$, as shown in connection with the rotor $A^2$, the construction of which is shown in Figs. 10 to 13; the faces $b^1$ of the end-plates are preferably serrated, and hardened and when employed for grinding scrap rubber the serrated grinding parts $a^{17}$, as shown in Figs. 10 to 13, may be fitted in recesses in the sides $a^{14}$ of the rotor.

The apex $a^{13}$ extends some distance radially beyond the part $a^{18}$ of the periphery immediately in front of it, and the rotor is driven in the direction of the arrow in Fig. 10.

The action is as follows:—

The material to be crushed, ground, masticated or mixed, say rubber or rubber compound, is fed in the form, say, of pieces of suitable size, into the inlet opening $c^2$; the material is then seized by the rotor, carried round the casing and pressed against the cylindrical wall of the casing interior, and is then, by the plough-like action of the apex $a^{13}$ divided and pressed into the spaces on each side between the faces $a^{14}$ of the rotor and the conical faces $b^1$ of the movable end-plates; these spaces are of wedge shaped configuration, and the material is compressed, ground and mixed as it is forced through the spaces between the portions of the rotor having maximum axial dimensions, and the faces of the end-plates. The end-plates, being held against rotation but being capable of outward axial movement against the yielding pressure, ensures the grinding, masticating or mixing being very effectively carried on between the side faces of the rotor and the faces of the end-plates.

By reason of this action between the end faces, in conjunction with a permissible relative axial movement between the said faces, under a yielding pressure, the machine possesses characteristics which render it exceptionally efficient for grinding, mixing, disintegrating or masticating a great variety of substances, and particularly those substances which, like rubber or rubber compounds, are difficult to masticate, and therefore difficult to thoroughly incorporate with other finely divided material such as the usual loadings employed in rubber compounds.

The temperature may be maintained at, or be raised to any desired value according to the temperature of the attemperating fluid circulated through the jackets of the casing, the end-plates and the rotor. The resistance to outward movement of the end-plates, provided by the fluid pressure on the rams E is varied by suitably varying the said pressure so as to control the width of the minimum space between the side surfaces.

As the casing fills with the mixture the ends thereof may move as described axially outwardly, but as the complete mixture and consolidation of the material takes place the hydraulic pressure forces the ends gradually inwardly, so that by the continued plough-like action of the rotor, and the consequent rolling, pressing, masticating and mixing action a very fine and homogeneous mixture is obtained.

The hydraulic rams are very suitable for use where considerable and uniform pressures are required to be exerted on the end-plates, but for many applications the use of spring means to provide this pressure is preferred, and such an arrangement is shown in the modification illustrated in Figs. 3 to 8.

Referring first to Fig. 3;—

In this modification the main casing $C^2$ is carried by a main frame $D^2$, and the rotor $A^2$ is constructed as shown in Figs. 10 to 14, and it is keyed on, or otherwise securely mounted on the shaft $a^{20}$, $a^{21}$ journalled in bearings carried by the brackets $d^{10}$ and $d^{11}$. The right hand end is journalled in a roller bearing of which $a^{22}$ and $d^{14}$ are the inner and outer races, and $d^{13}$ the rollers; the outer race is carried in the housing $d^{12}$ and the roller bearing is closed-in by the cover plate $d^{15}$; the housing $d^{12}$ has an extension $d^{12x}$ and also carries a double thrust bearing of any suitable type of which $a^{25}$ is the thrust collar. $f^2$ are pads constructed as described in conection with Figs. 1 and 2, and $F^2$ are the collars on which the pads bear. The thrust collar is mounted on the part $a^{20}$ of the shaft and is held fixed axially against the shoulder between the parts $a^{26}$ and $a^{24}$ by means of the sleeve $a^{27}$ and the lock nuts $a^{29}$ fitting the screwed part $a^{28}$, the sleeve serving to hold the race $a^{22}$ in position.

The other end $a^{21}$ of the shaft is carried by two bearings, an intermediate bearing carried in the housing $d^{16}$, preferably a roller bearing comprising an outer race $d^{18}$, rollers $d^{17}$, inner race $a^{38}$ and cover plate or gland $d^{19}$, and an outer bearing, also preferably a roller bearing carried in the housing $d^{20}$ and comprising an inner race $a^{39}$, outer race $d^{21}$, rollers $d^{22}$ and cover plate $d^{23}$.

The driving worm wheel $a^{37}$ is keyed to the end of the part $a^{21}$ of the shaft, and is housed in a casing $d^{25}$. The worm wheel is driven by a worm $g^1$ carried by a shaft G which in turn (see Fig. 5) is geared by a change wheel $g^2$ thereon to a change wheel $g^3$ on the shaft $g^4$, the latter shaft being connected to any suitable source of power such as the electric motor M, (see Figs. 4 and 6) the connection being made through a suitable brake $m^1$ which is applied when it is desired to bring the rotor $A^2$ to rest.

The main casing is made in two parts (see Figs. 6 and 7) $C^2$ which is carried from the main frame $D^2$, and $C^3$ which is pivotally attached to $C^2$ by a hinge pin $c^6$, the two parts of the casing being held in closed position by bolts $c^7$ passing through bosses $c^8$. The part of the casing $C^2$ has a water jacket $c^9$ and the part $C^3$ has a water jacket $c^{10}$, and the attemperating fluid is led into the jackets $c^9$ through the circulating pipe $c^{11}$ and leaves by the outlet pipe $c^{12}$, and is led to the jacket $c^{10}$ by the pipe $c^{13}$ and leaves by the outlet pipe $c^{14}$.

The material dealt with in the machine is removed through an opening formed at the side of the lower part $C^2$ of the main casing, which opening is fitted with a door K pivoted by the pin $k^1$ to the casing $C^2$. This door, (see Fig. 7) is operated by a worm wheel $k^2$, driven by the worm $k^3$ actuated by the hand wheel $k^4$; the worm wheel $k^2$ is mounted on a spindle $k^5$, journalled in the main frame and a bracket $k^6$, and the spindle $k^5$ has keyed to it a lever $k^7$ connected by the link $k^8$ and pins $k^9$ and $k^{10}$ to the door. The door is shown closed in Fig. 7, and is shown in dotted lines open in Fig. 6.

The end-plates $B^2$ and $B^3$ are made hollow and water is circulated through their interiors $b^6$ and $b^7$, through the former by the circulating pipes $b^8$ and $b^9$ and through the latter by the circulating pipes $b^{10}$ and $b^{11}$.

The cylindrical peripheries of the end-plates $B^2$ and $B^3$ are a fit in the cylindrical bore of the casing $C^2$, $C^3$, and they slide in fluid-tight manner on the shaft $a^{20}$, $a^{21}$, their bores being fitted (see Fig. 3) with neck bushes $b^{12}$ and glands $b^{13}$ between which suitable packing material is compressed to make the joint. The respective end-plates are provided with end guide plates $b^{14}$ which in turn (see Figs. 4, 5 and 6) have horizontal slides $b^{15}$ which fit between guide surfaces $j^1$ formed on the brackets $d^{11}$, and $j^2$ formed on the brackets J. The guide plates $b^{14}$ thus permit the axial movement of the end-plates $B^2$ and $B^3$ but prevent the rotation of these plates. The end-plates $b^{14}$ are provided (see Figs. 5 and 8) with hollow bosses $b^{16}$, and springs S are interposed between the respective hollow bosses $b^{16}$ and the hollow bosses $j^3$ of the bracket J, (see particularly Fig. 5), and it will be seen that the ends of the spring are housed in these respective bosses. The outer end of the spring abuts against a plate $s^1$ and the tension of the spring is adjustable by means of the screw $s^2$ and hand-wheel $s^3$, said screw fitting a screw-threaded hole in the end-plate $j^4$ of the boss $j^3$ and bearing against the plate $s^1$. $b^{17}$ are buffers of rubber or the like carried in recesses in the ends of the adjustable screws $b^{18}$ which fit screw-threaded holes in the ends of the respective hollow bosses $b^{16}$.

The material to be treated may be fed into the main casing through the mouth $c^{15}$; preferably however this opening is in this modification surmounted by an inlet hopper H (see Figs. 4, 4A, 6 and 6A) having at the top a door $h^1$, and at the side an opening $h^2$. Assuming that the rubber and a finely powdered material have to be thoroughly incorporated to form say a rubber compound, the powder is introduced at the top and is guided by the plates $h^3$ and $h^4$ to a mouth $h^5$ which is located over a helically grooved roller $h^6$ adapted to be rotated by a hand wheel $h^7$ (see Fig. 4), or by gearing so that by appropriate rotation of the roller a charge of the required quantity of the powder is delivered to the main casing. The charge of rubber is fed in at the opening $h^2$. $h^8$ is an inspection or observation opening.

When the machine is in operation the to-and-fro movement of the ends of the casing vary the capacity of the latter, and to prevent incoming or outgoing currents of air from tending to dissipate the powdered material in the hopper, an air vent $h^9$ is provided which opens into the casing at $h^{10}$ and opens to the atmosphere at the cowl $h^{11}$.

The rotor $A^2$ is, as stated, constructed as shown in Figs. 10 to 14 and its maximum axial dimension is between the points $a^{10}$ and $a^{11}$, the width of the circumference tapering in both directions to the apex $a^{13}$. A portion of the circumference is made concave as shown at $a^{12}$ and across an intermediate portion two inclined projecting parts $a^{15}$ are carried so as to form a secondary apex $a^{16}$. Serrated cutting plates $a^{17}$ are let into the side faces of the rotor; the portion of the periphery $a^{18}$ immediately in front of the apex $a^{13}$ as it revolves in the direction indicated by the arrow (Fig. 10), is located nearer to the centre than the outer edge of the apex so as to form a radially disposed plough-like cutting edge at the apex $a^{13}$.

It will be seen that as the rotor revolves in the casing, the main plough-like apex $a^{13}$ and secondary plough-like apex $a^{16}$ cut through the material being treated, divides it and forces it in an axial direction into the spaces between the sides $a^{14}$ of the rotor and the sides of the end-plates $B^2$ and $B^3$ (see Fig. 3) and thus intensifies the action of the machine as described in connection with the modification first referred to.

The attemperating fluid is circulated through the interior $a^{25}$ of the rotor $A^2$ as follows:—

The shaft $a^{21}$ is made hollow and a pipe $a^{32}$ is fitted in the bore $a^{30}$, the inner end of the pipe making joint with a bush $a^{34}$ fitting the end of the bore $a^{30}$; the bush has a port $a^{30\times}$ leading to a radial port $a^{31}$ in the shaft, said port being located on one side of a partition $a^{36}$, and a port $a^{33}$ leading to the annular space between the pipe $a^{32}$ and the bore $a^{30}$ being located on the other side of the said partition (see Fig. 7) the ports $a^{31}$ and $a^{33}$ are shown conventionally in Fig. 3; the angular relationship is that shown in Fig. 7.

Usually steam is supplied to the pipe $a^{32}$, and as the rotor revolves the water of condensation drains away through the port $a^{33}$ and annular passage-way in the shaft, the operation of the rotation diaphragm assisting in this action.

Referring now to Fig. 9;—

In this modification the construction is substantially similar to that described, $A^3$ being the rotor, $C^4$ the casing and $b^{20}$ the arms carried by the respective end-plates $B^4$ and $B^5$ of the casing. These arms have hollow bosses $b^{21}$ in which are housed the inner ends of the spring $S^1$, and the other ends of the spring fit in recesses $n^1$ formed in the bosses $n^2$ carried by the bearing brackets N. The end of each of the bosses $n^2$ is bored out to take a nut $n^3$ fitting the screw $n^4$, which screw has a cylindrical head $n^5$, the periphery of which is notched so as to engage with two feathers $n^6$ fitted to the bore of the boss $n^2$. The outer end of the spring $S^1$ abuts against the face of the head $n^5$ which is provided with a spigot $n^7$ which enters the bore of the spring and locates it centrally.

The worm-wheel $n^8$ is keyed on the exterior surface of the nut $n^3$; if therefore the worm-wheel $n^8$ and nut $n^3$ be rotated, the screw $n^4$ being held against rotation, and the nut $n^3$ being held against axial movement, the screw $n^4$ will be moved axially and will vary the degree of compression of the spring $S^1$.

An arrangement similar to that described is fitted to each of the springs $S^1$ shown, and the respective pairs of worm wheels at opposite ends of the casing are driven by worms $n^9$, the respective pairs of such worms being mounted on shafts $n^{10}$ and $n^{11}$. The shaft $n^{12}$, mounted in brackets $n^{13}$, has keyed to it a bevel wheel $n^{14}$ which gears with a bevel wheel $n^{15}$ on the shaft $n^{11}$. When the handwheel $n^{16}$ is turned, the shaft $n^{11}$ will be rotated and the two worm wheels $n^8$, operated by worms on this shaft, will be simultaneously rotated. In this way the springs $S^1$ which press the end-plate $B^4$ through the arms $b^{20}$ may be adjusted independently of the springs associated with end plate $B^5$; when this adjustment has been effected, a clutch element $n^{17}$, movable on, but keyed to the shaft $n^{12}$, is moved so as to engage the clutch element $n^{18}$ attached to the bevel wheel $n^{19}$ mounted freely on the shaft $n^{12}$, the bevel wheel $n^{19}$ gears with the bevel wheel $n^{20}$ mounted on the shaft $n^{10}$. When therefore the clutch elements are thus engaged, and the hand wheel $n^{16}$ is rotated it will be seen that the springs $S^1$ are all adjusted simultaneously.

The construction of rotor suitable for the arrangements described may be modified to suit the material to be treated; as for example as shown diagrammatically in Figs. 15 to 18.

The rotor $A^3$, instead of having two apices or ploughs such as $a^{13}$ and $a^{16}$ on Figs. 10 to 14, may be arranged to have but the one apex $a^{40}$. The sides $a^{41}$ of the rotor being inclined from the apex $a^{40}$ to the points $a^{42}$ and $a^{43}$ where the rotor reaches its maximum axial dimensions, (see the development to a smaller scale, Fig. 16), the sides $a^{41}$ being inclined in the reverse direction to the points $a^{44}$ and $a^{441}$, which are in the same radial plane as the apex $a^{40}$.

In another modification shown in Figs. 17 and 18, the rotor $A^4$ has two apices $a^{45}$ and $a^{451}$ each substantially similar in construction and function to the apex $a^{13}$ of Figs. 10 to 14, and being approximately diametrally opposite each other. The sides $a^{47}$ slope from the apex $a^{45}$ to points $a^{48}$ and $a^{49}$ where the rotor attains to one of its maximum axial dimensions. The sides $a^{50}$ are inclined from points $a^{48}$ and $a^{49}$ to points $a^{51}$ and $a^{52}$ which are approximately in the same radial plane as the apex $a^{51}$. The construction described occupies a half of the circumference of the rotor, the corresponding parts being $a^{471}$, $a^{481}$, $a^{491}$, $a^{501}$, $a^{51}$, $a^{52}$. Supplementary apices $a^{53}$ and $a^{54}$ may be fitted after the manner described in connection with the apex $a^{16}$ in Figs. 10 to 14.

In the modifications described the main casing is fixed, the rotor is fixed axially and the ends of the casing are adapted to move axially against a yielding resistance, and we have found this arrangement to be the most convenient in practice; the arrangement may, however, be modified by so constructing the casing and its end plates that they are held against axial or rotational movement, the end surfaces of the rotor being capable of axial movement in opposition to a yielding pressure, as shown for example in Fig. 19, in which the casing $C^4$ and its end-plates $B^5$ and $B^6$ are attached together and to the main frame so as to be held against rotational and axial movement, and in which the rotor consists of two parts $A^5$ and $A^6$ mounted on and driven by shafts $a^{54}$ and $a^{55}$, the relative axial movement between the two parts $A^5$ and $A^6$ being controlled by an interposed spring or springs $S^2$.

In a machine in which one rotor face and one end-plate face only is required for the process, the rotor $A^7$ (see Fig. 20) mounted on and rotated by the shaft $a^{56}$ may be held fixed axially, and the casing $C^5$ and the end-plate thereof may be fixed against rotation but be capable of axial movement relatively to the rotor, said axial movement being controlled by a spring $S^3$ interposed between the end-plate $B^7$ and a fixed boss $J^1$ mounted on a bracket $D^2$ carried from the main frame.

The details of construction may be modified in other respects, in accordance with the size of the machine and the nature of the materials to be treated; for example in some cases the yielding pressure may be conveniently applied by weights acting through levers; and where the machine is to be used for washing a water service may be led to the interior of the casing.

Having now fully described our invention we declare that what we claim and desire to secure by Letters Patent is:—

1. In a machine for grinding, mixing or masticating rubber and the like in combination;—a fixed casing; a rotating member mounted within the said casing, one side of the rotating member having surfaces inclined to the plane of rotation; means for revolving the rotating member within the casing; a charging opening in the periphery of the casing through which the material to be treated may be fed into the space between the said side of the rotating member and the adjacent end of the casing, the rotating member and the casing being so mounted as to permit of limited axial movement between them in opposition to a yielding force.

2. In a machine for grinding, mixing or masticating rubber and the like in combination;—a fixed casing; a rotating member mounted within the said casing, the opposite sides of the rotating member having surfaces inclined to the plane of rotation; means for revolving the rotating member within the casing; a charging opening in the periphery of the casing leading to the respective spaces between the opposite sides of the rotating member and the ends of the casing, the rotating member and the casing being so mounted as to permit of relative axial movement in opposition to a yielding force between the respective sides of the rotating member and the respective adjacent ends of the casing.

3. In a machine for grinding, mixing or masticating rubber and the like in combination;—a fixed casing; a rotating member mounted within and held fixed axially relatively to the said casing, the opposite sides of the rotating member having surfaces inclined to the plane of rotation; means for revolving the rotating member within the casing; a charging opening in the periphery of the casing leading to the respective spaces between the opposite sides of the rotating member and the ends of the casing; end plates adapted to close the ends of the casing and axially movable relatively to the casing; and means adapted to press the end plates inwardly by a yielding force.

4. In a machine for grinding, mixing or masticating rubber and the like in combination; a fixed casing; a rotating member mounted within and fixed axially relatively to the said casing, the opposite sides of the rotating member having surfaces inclined to the plane of rotation, two of said surfaces, disposed on opposite sides of the rotating member, extending from a centrally located apex to a part of the rotating member where the transverse dimensions are a maximum so as to form a plough-shaped part of the rotating member; means for revolving the rotating member within the casing; a charging opening in the periphery of the casing leading to the respective spaces between the sides of the rotating member and the ends of the casing; end plates adapted to close the ends of the casing and axially movable relatively to the casing; and means adapted to press the end plates inwardly by a yielding force.

5. In a machine for grinding, mixing or masticating rubber and the like in combination;—a fixed casing; a rotating member mounted within the said casing, the opposite sides of the rotating member having surfaces inclined to the plane of rotation; two of said surfaces, disposed on opposite sides of the rotating member, extending from a centrally located apex to a part of the rotating member where the transverse dimensions are a maximum so as to form a plough-shaped part of the rotating member, the peripheral portions of the plough-shaped part extending from the apex for some distance round the rotating member being cylindrical surfaces corresponding with the cylindrical bore of the casing, the remaining circumferential portion of the rotating member being reduced in diameter spirally to the root of the apex; means for revolving the rotating member within the casing; a charging opening in the periphery of the casing leading to the respective spaces between the sides of the rotating member and the ends of the casing; end plates adapted to close the ends of the casing and axially movable relatively to the casing; and means adapted to press the end plates inwardly by a yielding force.

6. In a machine for grinding, mixing or masticating rubber and the like in combination;—a fixed casing; a rotating member mounted within the said casing, the opposite sides of the rotating member having surfaces inclined to the plane of rotation; two of said surfaces, disposed on opposite sides of the rotating member, extending from a centrally located apex to a part of the rotating member where the tranverse dimensions are a maximum so as to form a plough-shaped part of the rotating member; the peripheral portions of the plough-shaped part extending from the apex for some distance round the rotating member, being cylindrical surfaces corresponding with the cylindrical bore of the casing, the remaining circumferential portion of the rotating member being reduced in diameter spirally to the root of the apex; a recess formed in the portion of the rotating member which has a cylindrical periphery; and a secondary plough-shaped part formed within the recess; means for revolving the rotating member within the casing; a charging opening in the periphery of the casing leading to the respective spaces between the sides of the rotating member and the ends of the casing; end plates adapted to close the ends of the casing and axially movable relatively to the casing;

and means adapted to press the end plates inwardly by a yielding force.

7. The modification of the apparatus claimed in claim 5 according to which two plough-shaped parts are formed on the rotating member, the apices being oppositely located.

8. The modification of the apparatus claimed in claim 6, according to which two plough-shaped parts with recesses and secondary plough-shaped parts are formed on the rotating member, the apices being oppositely located.

9. In a machine for grinding, mixing or masticating rubber and the like in combination;—a fixed casing; a rotating member mounted within the said casing, one side of the rotating member having surfaces inclined to the plane of rotation; means for revolving the rotating member within the casing; a charging opening in the periphery of the casing through which the material to be treated may be fed into the space between the said side of the rotating member and the adjacent end of the casing; an axially movable end plate closing the said end of the casing; yielding means adapted to press the said end plate inwardly; means for regulating the pressure exerted by the yielding means; and means for preventing axial movement of the rotating member.

10. In a machine for grinding, mixing or masticating rubber and the like in combination;—a fixed casing; a rotating member mounted within the said casing, the opposite sides of the rotating member having surfaces inclined to the plane of rotation; means for revolving the rotating member within the casing; a charging opening in the periphery of the casing leading to the respective spaces between the opposite sides of the rotating member and the ends of the casing; axially movable end plates adapted to close the respective ends of the casing; yielding means adapted to press the said end plates together, means for regulating the pressure exerted by the yielding means; and means for preventing axial movement of the rotating member.

11. Apparatus as claimed in claim 1, in which the yielding force is provided by means of spring pressure.

12. Apparatus as claimed in claim 2 in which the yielding force is provided by means of spring pressure.

13. Apparatus as claimed in claim 3 in which the yielding force is provided by means of spring pressure.

14. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing; axially disposed spiral springs respectively pressing on the said end plates; and means for carrying the spring pressure.

15. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing; a plurality of axially disposed spiral springs pressing on the respective end plate; and means for varying the pressure exerted by each of the springs simultaneously.

16. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing; plurality of axially disposed spiral springs one end of each pressing against an end plate; a corresponding number of non-rotatable screwed members on end of each pressing a corresponding spring against an end plate; a series of nuts fitting the respective screwed members and held against axial movement; and means for simultaneously rotating the nuts.

17. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; cylindrical end openings in the casing; end plates having cylindrical peripheries fitting said openings and having extensions external to the casing; guides for the said extensions; axially disposed spiral springs respectively pressing on the said end plates; and means for varying the spring pressure.

18. In a machine for mixing, grinding or masticating rubber and the like, in combination;—a fixed cylindrical casing; a charging opening in the periphery of the casing; a rotating member axially mounted in the casing and having side surfaces inclined to the plane of rotation; a driving shaft to which the said member is fixed; bearings in which the shaft is rotationally carried; a thrust bearing by which the said shaft is held against axial movement in either direction; end plates adapted to close the respective ends of the casing, movable axially relatively to the casing and through which the said shaft passes; axially disposed spiral springs respectively pressing on the said end plates; and means for varying the spring pressure.

19. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing, the interior surfaces of the said end plates being of conical configuration and being serrated; axially disposed spiral springs respectively pressing on the said end plates; and means for varying the spring pressure.

20. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing; axially disposed spiral springs respectively pressing on the said end plates; means for varying the spring pressure; a discharge opening in the lower part of the casing; a pivoted door adapted to close the said discharge opening; a shaft; levers on the shaft; links connecting the said lever to the said pivoted door; a worm wheel segment on the shaft; and a worm and hand wheel to operate the worm segment.

21. In apparatus as claimed in claim 14 constructing the casing in two parts pivotally connected together.

22. In apparatus as claimed in claim 14 constructing the casing in two parts pivotally connected together each part having a water jacket through which a cooling liquid is circulated.

23. In apparatus as claimed in claim 18, a cavity within the rotating member; a channel in the driving shaft communicating with said cavity round a conduit in the said channel the end of which opens into the said conduit at a point some distance from the centre of rotation.

24. In a machine for mixing, grinding or masticating rubber and the like, in combination;—a fixed cylindrical casing; a charging opening in the periphery of the casing; a rotating member axially mounted in the casing and having side surfaces inclined to the plane of rotation; means for holding the said member axially fixed relatively to the casing; means for rotating the said member; end plates adapted to close the respective ends of the casing and movable axially relatively to the casing; axially disposed spiral springs respectively pressing on the said end plates; means for varying the spring pressure; a feed hopper fitting the casing inlet; an inlet to the hopper for the material to be ground; an inlet to the hopper for powder; a roller to control the feed of the powder; and an air vent to permit the passage of air between the casing and the atmosphere independently of the inlet for powder.

In witness whereof we have hereunto set our hands.

FRANK GARNER.
ALFRED HALL.